United States Patent
Grubb et al.

[11] 3,720,048
[45] March 13, 1973

[54] TRACTOR DRAWN MOWER

[75] Inventors: Willard L. Grubb, Richmond; Howard E. Turner, Jeddo, both of Mich.; James W. Brazell, Atlanta, Ga.

[73] Assignee: Heath International, Inc., Richmond, Mich.

[22] Filed: Feb. 16, 1971

[21] Appl. No.: 115,248

[52] U.S. Cl. .......................56/15.9, 56/11.9, 56/503
[51] Int. Cl. .................................................A01d 35/26
[58] Field of Search........56/6, 11.9, 14.9, 15.9, 16.3, 56/503

[56] References Cited

UNITED STATES PATENTS

| | | | |
|---|---|---|---|
| 3,334,476 | 8/1967 | Engler | 56/15.9 |
| 2,891,369 | 6/1959 | Rietz | 56/503 X |

FOREIGN PATENTS OR APPLICATIONS

| | | | |
|---|---|---|---|
| 120,389 | 5/1959 | U.S.S.R. | 56/6 |

Primary Examiner—Russell R. Kinsey
Assistant Examiner—J. A. Oliff
Attorney—Donnelly, Mentag & Harrington

[57] ABSTRACT

A flexible tracked tractor having a mower operatively connected to the rear end thereof. The mower is provided with a ground engaging wheel at the rear end thereof, and it is supported at the front end thereof by a three-point lift hitch which is attached to the rear end of the flexible tracked tractor. The rotary cutter is power driven from a pressurized hydraulic fluid source carried on the tractor. The rotary cutter is operatively connected through a gear type coupling to a hydraulic drive motor which is provided with hydraulic fluid under pressure from said pressurized hydraulic fluid source on said tractor. The three-point lift hitch includes an upper link having one end pivotally attached to the front end of the mower and the other end pivotally attached to the tractor, a lower link assembly having one end thereof pivotally attached to the tractor and the other end thereof pivotally attached to the front end of the mower at two spaced apart positions below the attachment position of the upper link, a lift bar having a lower end pivotally attached to said lower link assembly, a lever pivotally mounted on a horizontal axis on said tractor, and with the upper end of said lift bar being pivotally attached to said lever on a horizontal axis at a position laterally spaced apart from, and parallel to, the pivot axis of said lever on said tractor, and power means mounted on said tractor and being pivotally connected to said lever on a horizontal axis at a point triangularly spaced from, and parallel to, the pivotal mounting axes of said lever and said lift bar, wherein when the power means is actuated, the lever is pivoted upwardly from a mowing position to lift said lower link assembly to a raised position.

34 Claims, 16 Drawing Figures

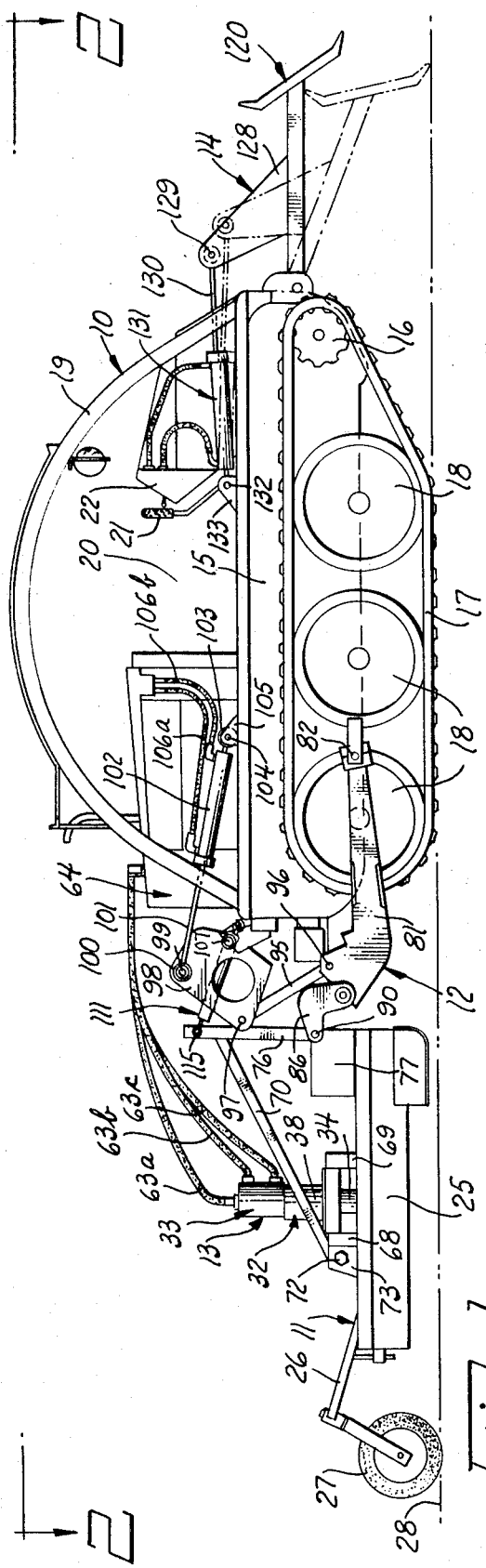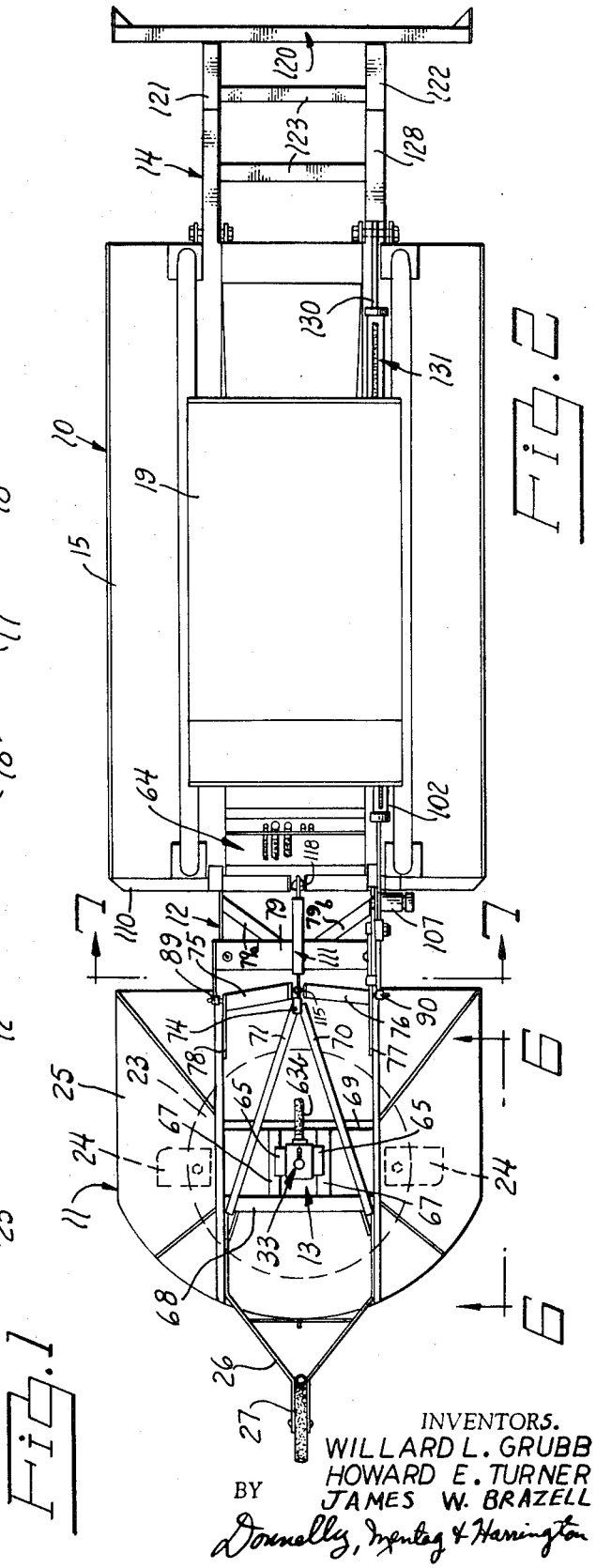

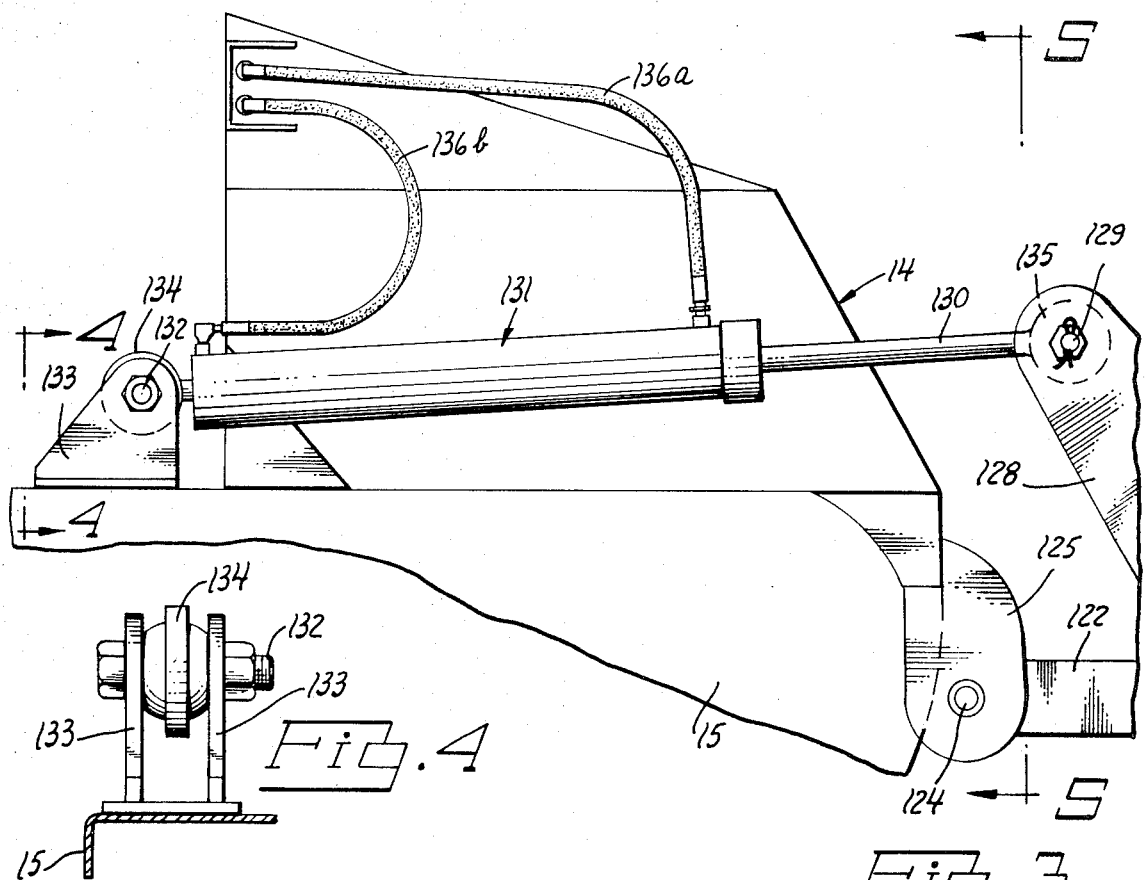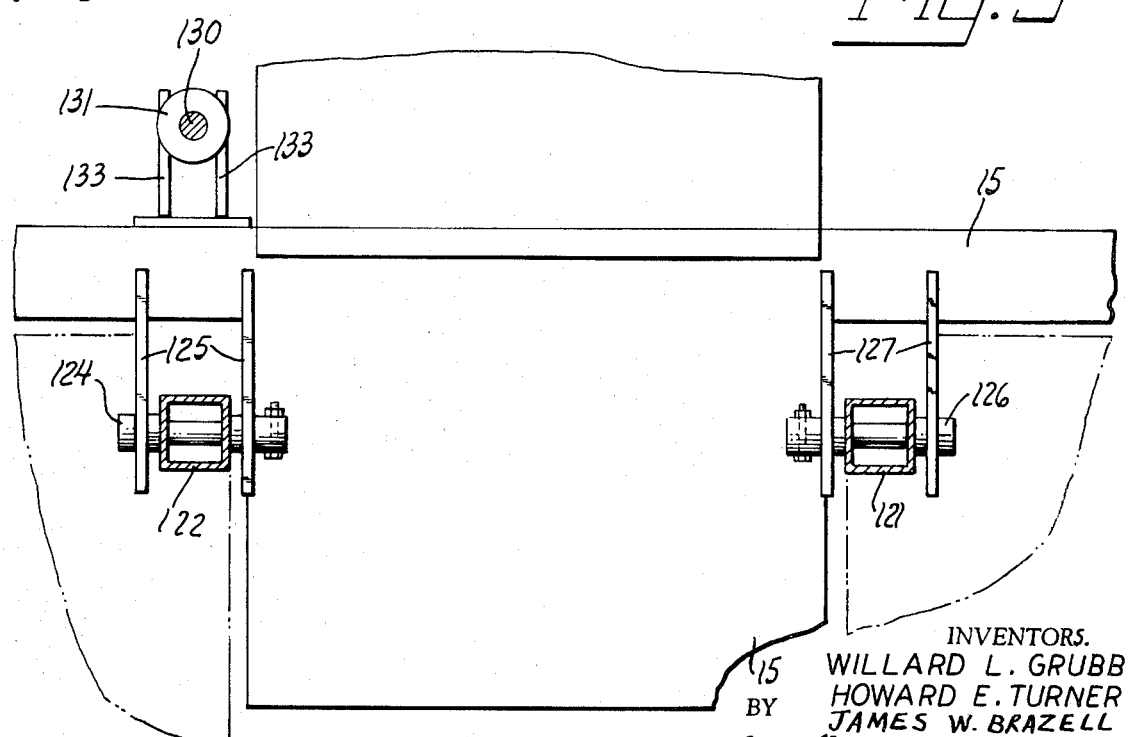

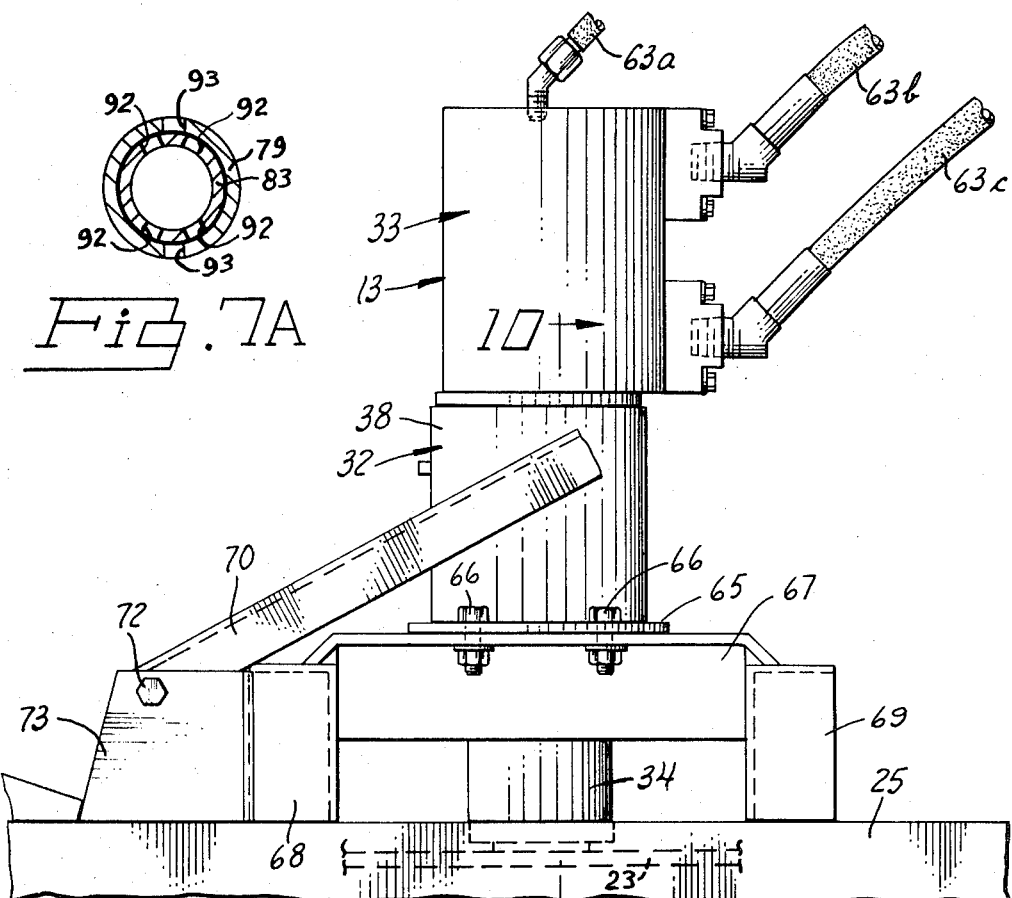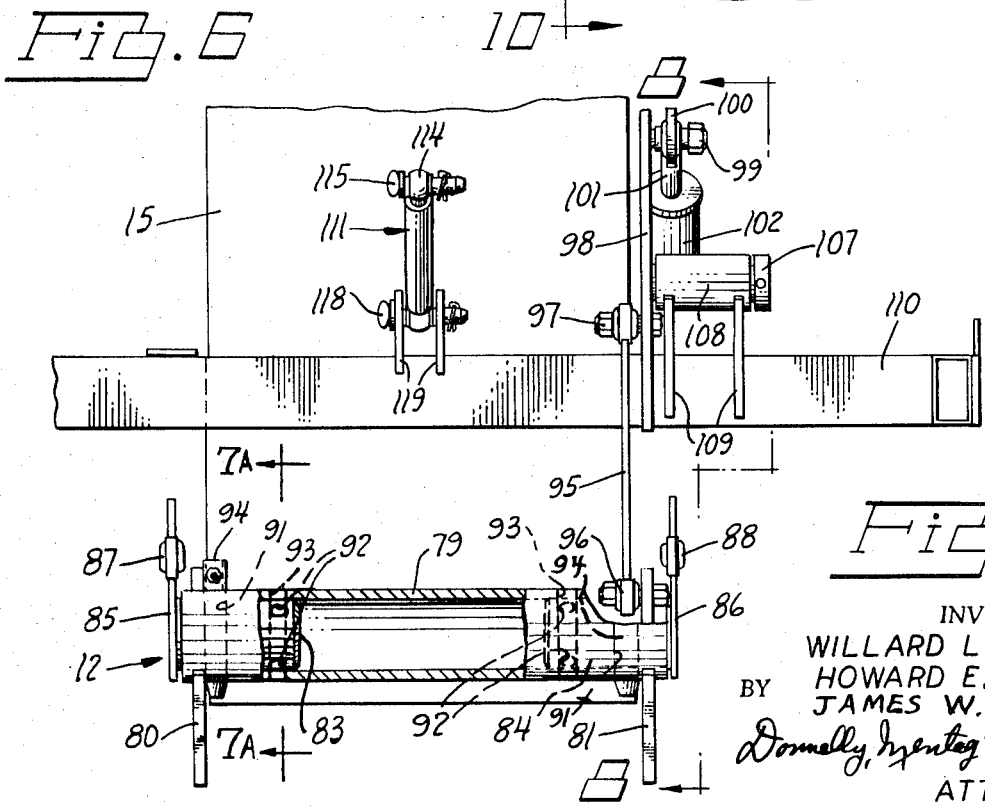

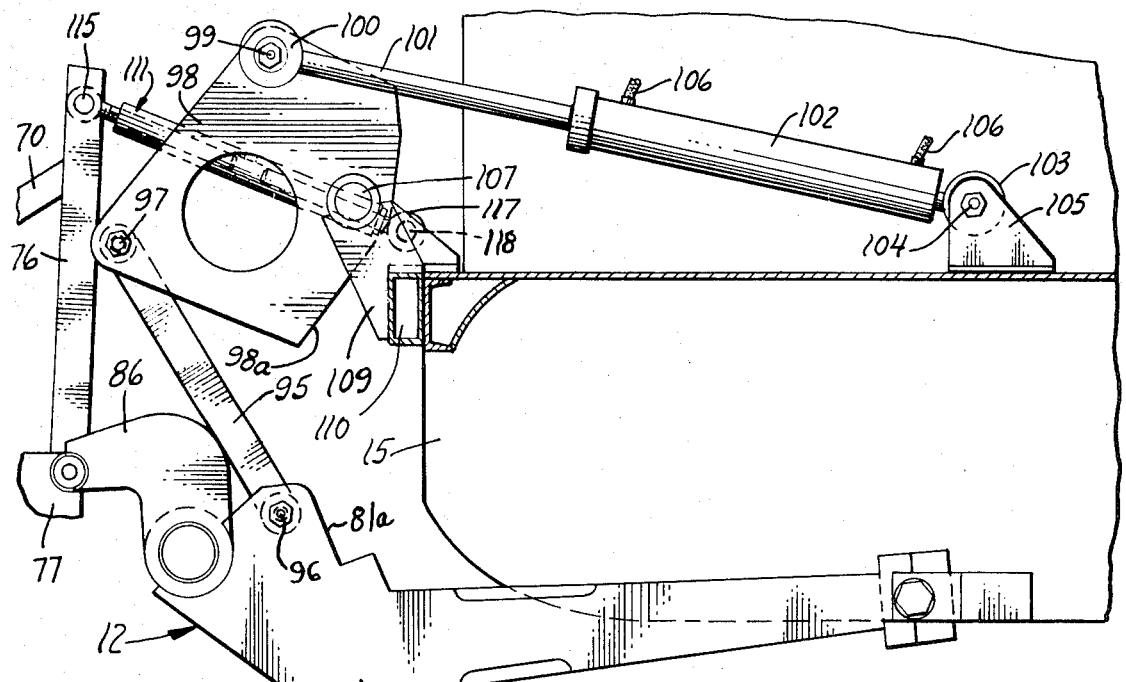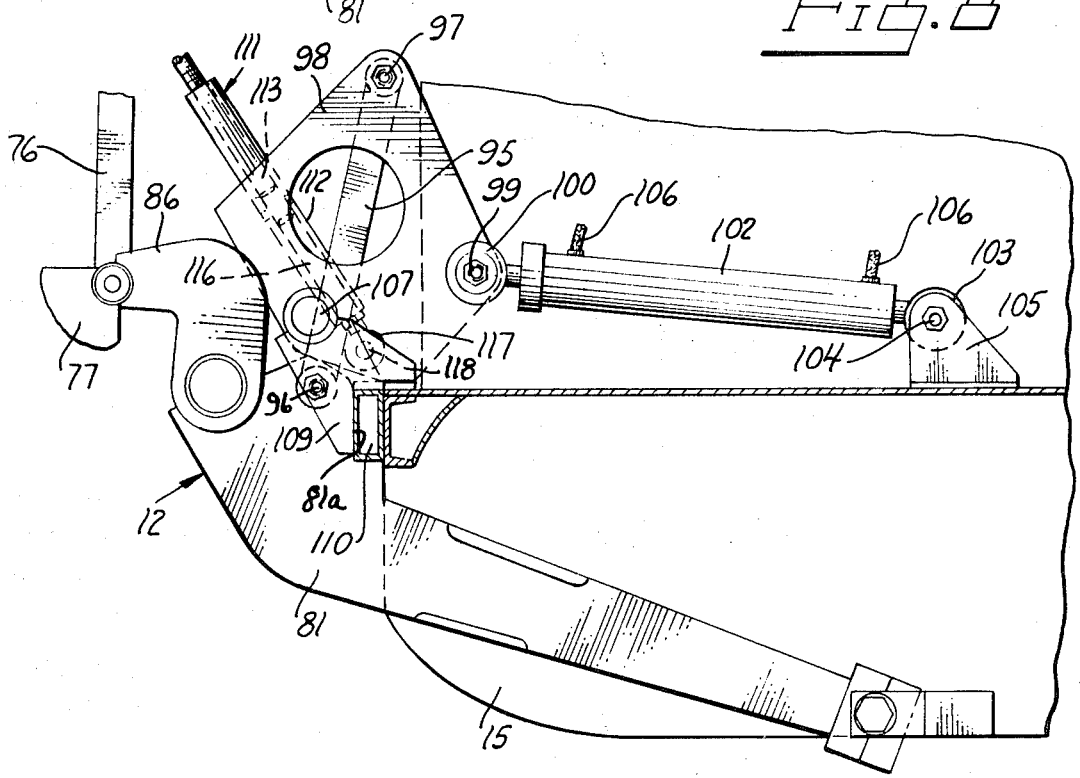

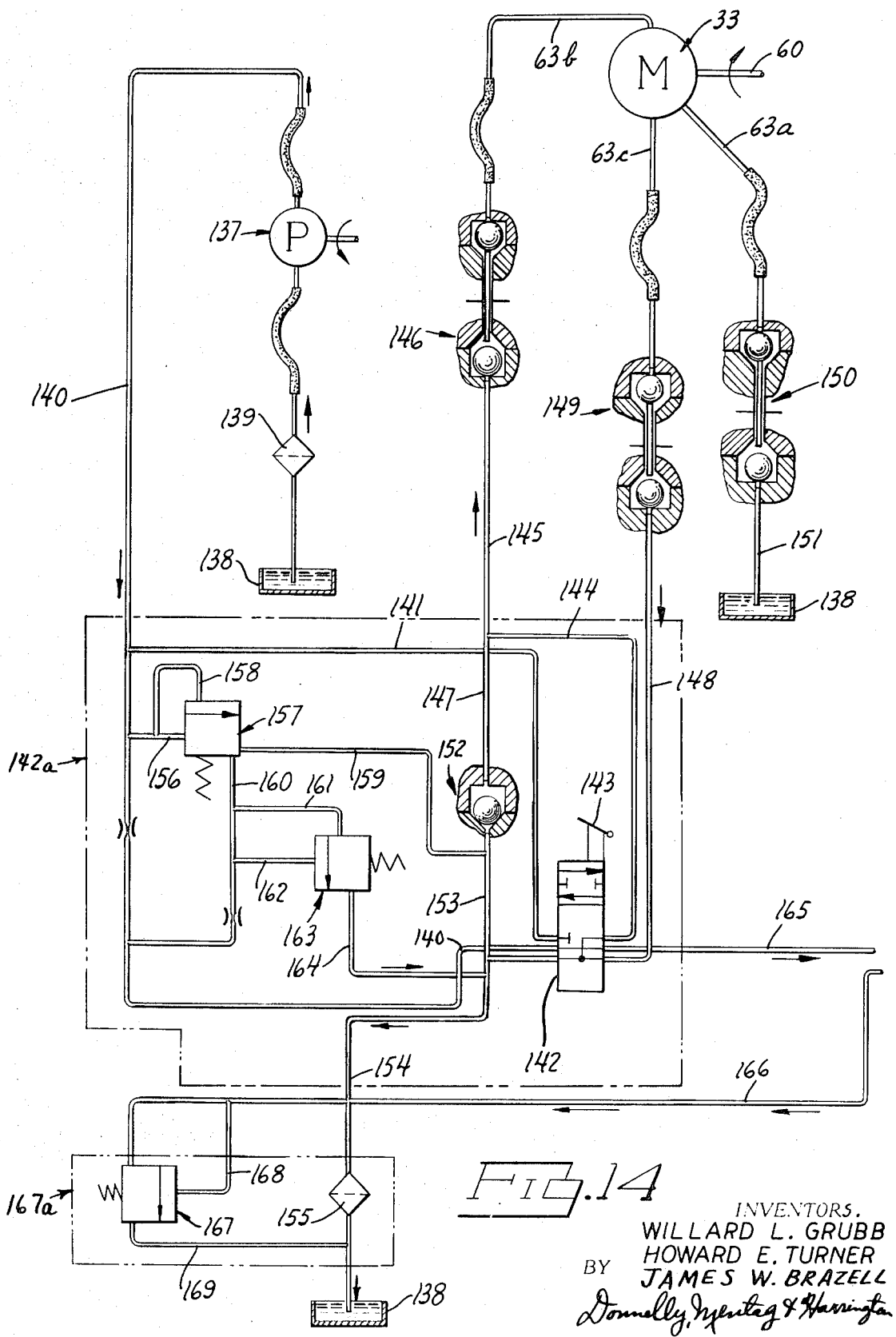

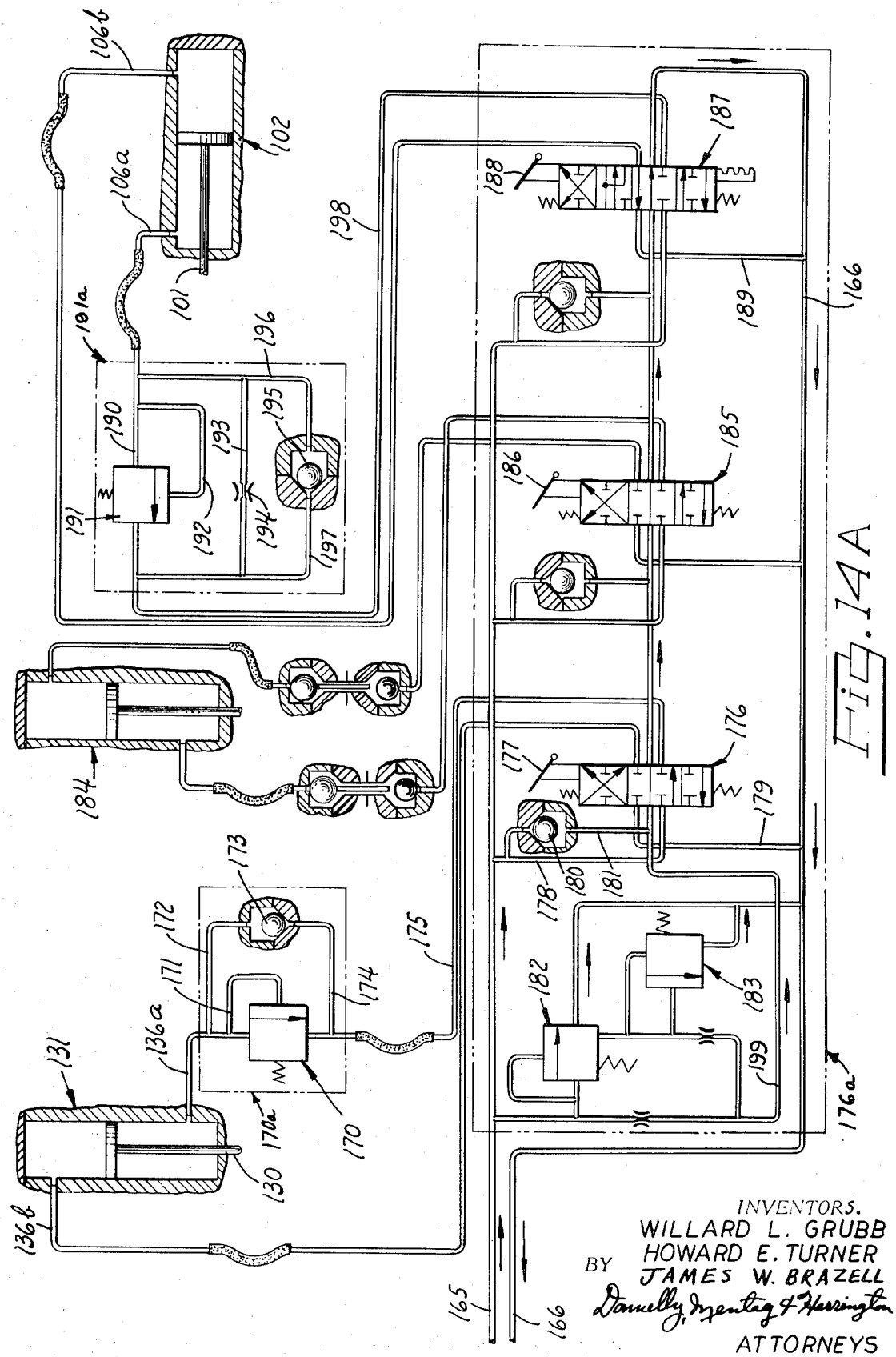

TRACTOR DRAWN MOWER

SUMMARY OF THE INVENTION

This invention relates generally to tractor drawn mowers, and more particularly, to a rotary cutter mower which is drawn by a flexible tracked vehicle and which is rotated by means powered from a power source carried on the vehicle.

Tractor drawn rotary mowers have been provided heretofore. However, a disadvantage of the prior art mowers is that they are not capable of negotiating a steep angle change in terrain. The prior art mowers have employed rubber tired tractors and drawbar hitch arrangements which do not allow a steep angled use of the mower. Another disadvantage of the prior art rubber tired tractor drawn mowers is that most of such type tractors have a long hood and the driver's visibility is hampered because of such structure. A further disadvantage of the prior art tractor drawn mowers is that they include a preset mechanical drive ratio between the ground speed of the tractor and the speed of the mower rotary cutter. The prior art tractor drawn mowers are not capable of backing into an angled terrain and mowing it, because the prior art hitches maintain the mower level in the fully raised, fully lowered, or intermediate positions. Still another disadvantage of the prior art tractor drawn mowers is that they are not capable of providing a mechanical up-lock for the mower when it is in a raised position, and they are held in a raised position by a hydraulic system which is subject to hydraulic failure. A further disadvantage of the prior art tractor drawn mowers is that any shocks incurred by the rotary mower are conveyed to the tractor.

In view of the foregoing, it is an important object of the present invention to provide a novel and improved tractor drawn mower which overcomes the aforementioned disadvantages of the prior art tractor drawn mowers.

It is another object of the present invention to provide a novel and improved tractor drawn mower which includes a flexible tracked vehicle, a rotary cutter mower, means for operatively driving the rotary cutter and being connected to a power source on the vehicle, and a three-point universal lift hitch having two of the attachment points located on the sides of the flexible tracked vehicle at a low point so as to provide the mower with a low line of pull. The lift hitch permits the mower to negotiate a steep angle of change in the terrain when the mower is in use. The rotary cutter can be driven by a hydraulic drive which absorbs some of the shock forces incurred by the rotary cutter so as to eliminate some of the shock forces being passed onto the pulling vehicle. The universal lift hitch is constructed and arranged to be mechanically locked when the mower is in a fully raised position above the ground. The hydraulic controls and kinematic arrangement of the lift hitch together permit the mower to float relative to the vehicle. The lift hitch is also provided with a mechanical down-stop. The universal lift hitch is constructed and arranged to permit tilting of the mower about its longitudinal axis. The flexible tracked vehicle may also be provided with a scraper blade assembly on the front end thereof for knocking down brush and small trees for subsequent cutting by the mower after the vehicle has passed over the brush and trees.

It is still another object of the present invention to provide a novel and improved tractor drawn mower which may be used to cut weeds, brush, small trees, and other foliage to provide demarcation paths in forests without the use of herbicides and thus minimize pollution of forests.

It is still another object of the present invention to provide a novel and improved tractor drawn mower which is simple and compact in construction, economical to manufacture, and efficient in operation.

Other objects, features and advantages of this invention will be apparent from the following detailed description, appended claims, and the accompanying drawings.

BRIEF DESCRIPTION OF THE DRAWINGS

FIG. 1 is a side elevation view of a tractor drawn mower made in accordance with the principles of the present invention.

FIG. 2 is a top plan view of the mower structure illustrated in FIG. 1, taken along the line 2—2 thereof, and looking in the direction of the arrows.

FIG. 3 is a fragmentary, side elevational view of the scraper blade assembly shown on the front end of the flexible tracked tractor of FIG. 1.

FIG. 4 is a fragmentary, elevational section view of the structure illustrated in FIG. 3, taken along the line 4—4 thereof, and looking in the direction of the arrows.

FIG. 5 is a fragmentary, elevational section view of the structure illustrated in FIG. 3, taken along the line 5—5 thereof, and looking in the direction of the arrows.

FIG. 6 is a fragmentary, enlarged, elevational view of the structure illustrated in FIG. 2, taken along the line 6—6 thereof and looking in the direction of the arrows.

FIG. 7 is a fragmentary, enlarged, elevational section view of the structure illustrated in FIG. 2, with parts broken away, taken along the line 7—7 thereof, and looking in the direction of the arrows.

FIG. 7A is an elevational section view of the structure illustrated in FIG. 7, taken along the line 7A—7A thereof, and looking in the direction of the arrows.

FIG. 8 is a fragmentary, elevational section view of the structure illustrated in FIG. 7, taken along the line 8—8 thereof, and looking in the direction of the arrows.

FIG. 9 is a view similar to FIG. 8 and showing the lift hitch structure in a raised and locked position.

FIGS. 14 and 14A illustrate an illustrative hydraulic system which may be used in the invention.

DESCRIPTION OF THE PREFERRED EMBODIMENT

Figure 10:
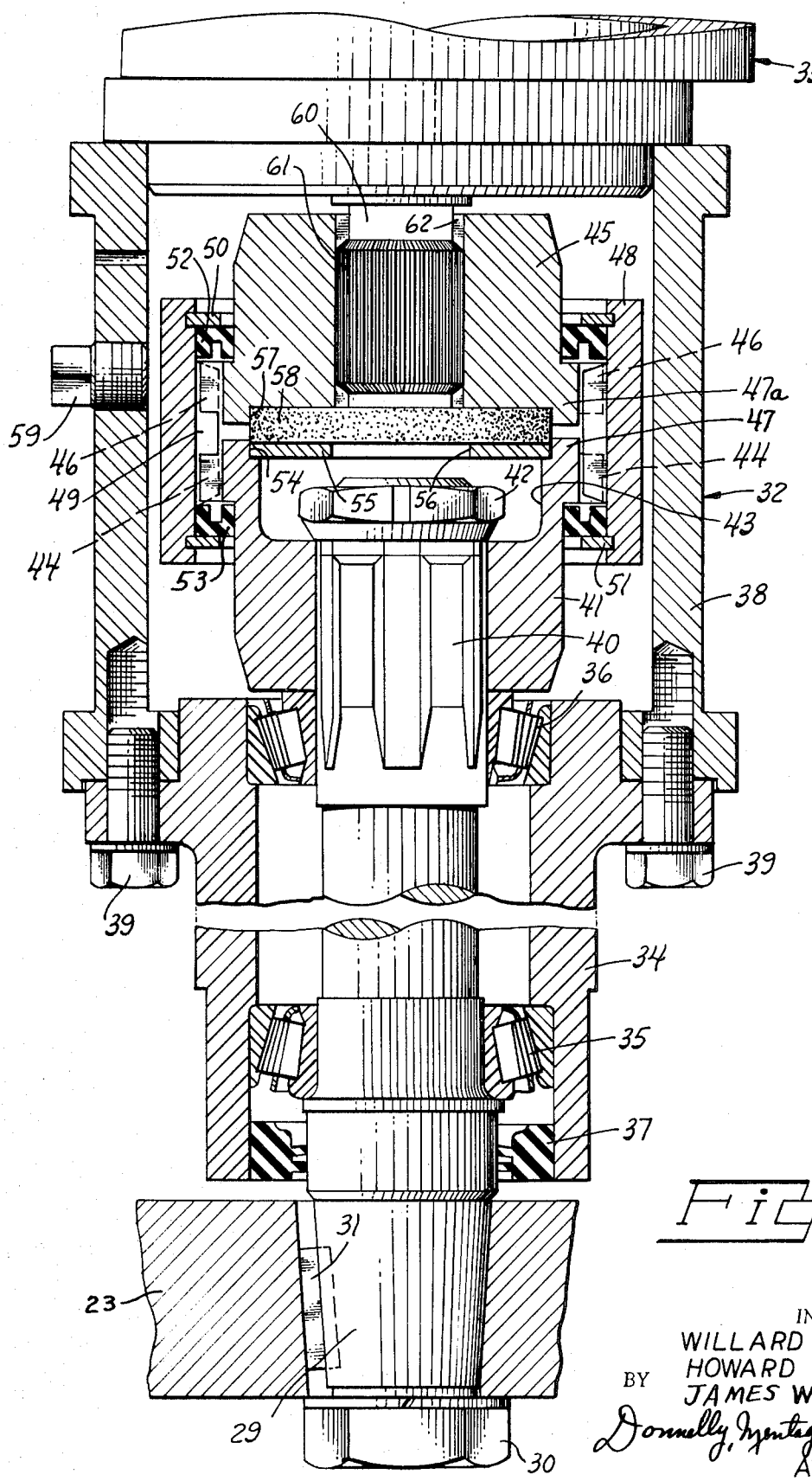
FIG. 10 is an enlarged, broken, elevational section view of the drive coupling structure illustrated in FIG. 6, taken along the line 10—10 thereof, and looking in the direction of the arrows.

Referring now to the drawings, and in particular to FIG. 1, wherein is shown an illustrative embodiment of the invention, the numeral 10 generally designates a flexible tracked vehicle or tractor which may be employed in the invention. The numeral 11 generally designates a rotary cutter mower assembly which is operatively attached to the vehicle 10 by a universal three-point lift hitch assembly generally indicated by the numeral 12. The numeral 13 designates a rotary drive assembly employed for rotating the rotary cutter in the mower assembly 11. The numeral 14 generally designates a dozer or scraper blade assembly which is operatively mounted on the front end of the vehicle 10.

The flexible tracked vehicle 10 may be selected from any suitable vehicle of this type now available on the market, as, for example, the Model J-5 tractor available on the market from the Bombardier Ltd. of Valcourt, Quebec. The numeral 15 designates the body of the vehicle in which is mounted the vehicle engine and power drive means. The power drive means of the vehicle 10 includes a drive sprocket 16 on each side of the vehicle, each of which is adapted to drive a flexible track 17 that is operatively trained around a plurality of wheels 18. The numeral 19 in FIGS. 1 and 2 designates a head cover and guard for the operator of the tracked vehicle who would be seated in the seating area 20. The numeral 21 designates one of two similar levers used for steering and braking the vehicle. The numeral 22 designates a vehicle instrument and control board.

As illustrated in FIG. 2, the rotary cutter assembly 11 includes a rotary cutter comprising a rotor member 23 on which is operatively mounted a pair of oppositely disposed cutter blades 24. The rotor member 23 is operatively mounted within a suitable guard housing 25 which is made from a suitable metal or the like. A wheel supporting bracket 26 is adjustably attached to the rear end of the housing 25 and it rotatably carries a support wheel 27 which is adapted to roll on the ground surface 28 and maintain the rear end of the cutter housing 25 in a predetermined elevation above the ground surface 28.

As best seen in FIG. 10, the rotor member 23 is attached to the lower end of a drive spindle or shaft 29 by a nut and lock washer assembly 30 and a key 31. The spindle 29 comprises the driven shaft of a gear type coupling, generally indicated by the numeral 32 in FIGS. 6 and 10. The coupling 32 is operatively connected to and driven by a suitable hydraulic motor generally indicated by the numeral 33.

As shown in FIG. 10, the spindle 29 is rotatably mounted in a spindle housing 34 by a pair of tapered roller bearings 35 and 36. A suitable annular seal 37 is operatively mounted around the lower end of the spindle 29 in the housing 34. A coupling housing 38 is releasably secured to the upper end of the spindle housing 34 by a plurality of suitable lock washers and bolts 39.

As shown in FIG. 10, the upper end of the spindle 29 is provided with a suitable spline 40 on which is operatively mounted a coupling member 41 that is secured to the spindle 29 by a lock nut 42. The lock nut 42 is seated in a recess 43 formed in an upper enlarged head portion of the coupling member 41. The coupling member 41 is provided with a peripheral spline 44 around the periphery of an enlarged upper end portion 47. The numeral 45 designates a second coupling member or motor coupling member which is shaped similar to the spindle coupling member. An enlarged lower end portion 47a of the motor coupling member 45 is provided with spline 46 around the periphery thereof. The coupling members 41 and 45 are drivably connected by a coupling sleeve 48 which is provided with an internal spline 49 that is adapted to mesh with and connect the splines 44 and 46. The coupling sleeve 48 is secured in an operative position by a pair of retainer snap rings 50 and 51, and a pair of annular seals 52 and 53 which are seated on shoulders formed by the enlarged coupling portions 47 and 47a.

As shown in FIG. 10, the recess 43 which is formed in the upper end of the coupling member 41 is provided with an enlarged step at the outer end thereof to provide a shoulder 54 on which is seated a suitable metal washer 55 that is provided with an axial hole 56. The upper coupling member 45 is provided with a recess in its enlarged lower end 47 that is indicated by the numeral 57 and in which is operatively seated a cylindrical cushion 58 made from a suitable material such as rubber. The cushion 58 is adapted to engage and seat on the washer 55. The housing 38 is adapted to be provided with suitable lubricating fluid which may be inserted through a suitable hole formed in the housing 38 and closed by a pipe plug 59.

As shown in FIG. 10, the hydraulic coupling drive motor 33 is provided with a drive shaft 60 which has a splined end 61 that is adapted to be seated in a splined hole 62 formed in the upper end of the motor coupling member 45.

As shown in FIG. 1, the hydraulic motor 33 is adapted to be operatively connected to a suitable source 64 of hydraulic pressurized fluid, which is carried on the vehicle 10, by a plurality of hydraulic connecting hoses as 63a, 63b and 63c. An illustrative hydraulic control system is described hereinafter in detail.

As shown in FIG. 2, the coupling housing 38 is provided on each side with a flange 65 (both flanges 65 appear in FIG. 2) which is supported on a longitudinally extended, support angle member 67. As shown in FIG. 6, each of the flanges 65 is releasably secured to one of the support angle members 67 by a pair of suitable bolts and nuts indicated by the numeral 66. Each support angle member 67 is fixedly secured to the top of the mower housing 25 by any suitable means, as by a pair of transversely mounted angle bar members 68 and 69 which have their ends enclosed by suitable plates.

As shown in FIG. 6, the mower 11 is provided with a lift bracket which includes a pair of elongated angle bars 70 and 71, which extend rearwardly and downwardly, as shown in FIG. 1. The rear or lower ends of each of the angle bars 70 and 71 are attached, as shown in FIG. 6, to the mower housing 25 by a bolt and nut assembly 72 which attaches each bar to a vertically disposed bracket plate 73 that is secured to the top of the mower housing 25 by any suitable means, as by welding. As illustrated in FIG. 2, the front or upper ends of the angle bars 70 and 71 converge and are fixedly connected to each other and to a pair of vertically extended transverse lift bracket arms 75 and 76, by any suitable means, as by welding. The lower ends of the bracket arms 75 and 76 are fixed to the vertically disposed plates 77 and 78 by any suitable means, as by welding. The plates 77 and 78 are in turn secured, as by welding, to the upper face of the mower housing 25.

The universal three-point lift hitch includes a lower link assembly that comprises a transverse tubular shaft 79, which is best seen in FIG. 7. The tubular shaft 79 is fixedly secured to the rear ends of a pair of spaced apart, elongated links 80 and 81, by any suitable means, as by welding. As illustrated in FIGS. 1 and 8, the right link 81 extends forwardly and along one side of the vehicle 10. The link 80 extends forwardly along the left side of the vehicle 10. The front ends of each of the links 80 and 81 are pivotally connected to the vehicle 10 at a low point. Each of these links is similarly connected and the connection of only one of the links has been illustrated in FIGS. 1 and 8. As best seen in FIG. 1, the front end of the link 81 is rotatably mounted, by a suitable trunnion means, as indicated by the numeral 82, to the frame of the vehicle 10 at a low point on the vehicle, and at a point which is substantially aligned in height with the axes of rotation of the vehicle wheels 18. The low point attachment of the links 80 and 81 to the vehicle 10 eliminates any tendency of the vehicle 10 to tip up or down when pulling a high drawbar load. As shown in FIG. 9, when the lower link assembly is in the raised position, the cut-out portion indicated by the numeral 81a on the upper face of the link 81 is adapted to engage the stiffener transverse member 110 to provide a mechanical up-stop. The link 80 is also provided with a similar cut-out. Link 80 is attached to the left side of the vehicle 10 in the same manner as the link 81.

The lower link assembly is hingedly connected to the mower 11 at two spaced apart points by the following described structure. As shown in FIG. 7, a pair of tubular pivot pins 83 and 84 are mounted in the outer ends of the tubular shaft 79. Fixedly mounted on the outer ends of the tubular pivot pins 83 and 84 are the link arms 85 and 86, respectively. The upper ends of the link arms 85 and 86 are provided with suitable ball joints 87 and 88, respectively. As shown in FIGS. 1 and 2, the ball joint 88 is attached by a suitable pin 90 to the plate 77 on the mower 11. The ball joint 87 is similarly secured by the pivot pin 89 to the plate 78 as shown in FIG. 2.

As shown in FIG. 7, the tubular pivot pins 83 and 84 are secured in the tubular shaft 79 by a pair of retainer pins 94 which are mounted through suitable holes 91 that extend through the shaft 79 and the pins 83 and 84. The tubular pins 83 and 84 are provided with additional transverse holes as 92 which are adapted to be aligned with holes 93 in shaft 79 to provide for incremental adjustment of the pin 83 relative to pin 84, to tilt the mower 11 about its longitudinal axis (FIG. 7A). In order to tilt the mower, it is only necessary to remove the retainer pin 94 at one of the sides of the tubular shaft 79 and rotate the pivot pin 83 or 84 in which that particular retainer pin 94 is mounted so as to align a desired transverse hole, as 92, with the mating holes 93 in the tubular shaft 79, and then insert the retainer pin 94 in said holes 92 and 93.

The lower link assembly is adapted to be lifted or raised by the following described structure. As best seen in FIG. 8, a lift link or bar 95 is provided on the lower end thereof with a ball joint assembly 96 which is pivotally mounted to the upper side of the rear end of the link 81. The upper end of the lift link 95 is hingedly attached by a similar ball joint assembly, indicated by the numeral 97, to a lift lever 98. The lift lever 98 is formed from a plate. As shown in FIG. 8, the lift lever 98 is hingedly connected by a hinge pin means 99 to a ball joint 100 operatively carried on the outer end of the hydraulic cylinder rod 101 of a hydraulic cylinder 102. The head end of the hydraulic cylinder 102 is hingedly connected by a ball joint 103 and a suitable hinge pin 104 to a support bracket formed by a pair of spaced apart bracket plates 105 which are fixedly secured to the vehicle 10 by any suitable means, as by welding. The hydraulic cylinder 102 is supplied with hydraulic fluid under pressure through the hydraulic hoses 106a and 106b, as more fully described hereinafter.

The lever 98 is hingedly supported on the vehicle 10 by the following described structure. As best seen in FIG. 7, a horizontal pivot tube 108 is fixedly carried on the upper end of a pair of spaced apart bracket plate 109 which are secured as by welding to a transverse stiffener tube 110 that is secured to the back end of the vehicle 10. A pivot pin 107 is rotatably mOunted in the tube 108 and is fixed to the lever 98, and pivotally supports the lever 98 for rotation between the fully raised position shown in FIG. 9 and a fully lowered position wherein the front face 98a, shown in FIG. 8, engages the upper face of the stiffener tubing 110 to provide a mechanical down-stop position.

It will be seen that the lift link 95, the cylinder rod 101, and the pivot pin 107 are disposed on the lift lever 98 at triangularly spaced apart positions, whereby when the cylinder 102 is actuated to rotate the lever 98 upwardly, the link 95 centerline moves past the center of the pivot pin 107 to provide a mechanical up-lock for the lift hitch structure. The lift hitch structure is thus held in FIGS. 7 and 9 in the raised position by a mechanical lock which is not subject to any hydraulic failure in the hydraulic system which provides hydraulic fluid to the cylinder 102.

Figure 11:
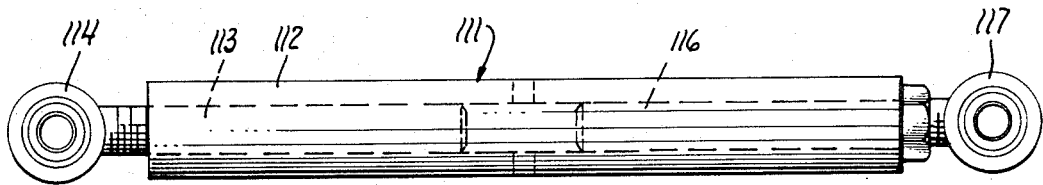
FIG. 11 is an elevational view of the upper link used in the lift hitch structure illustrated in FIG. 8.
Figure 12:
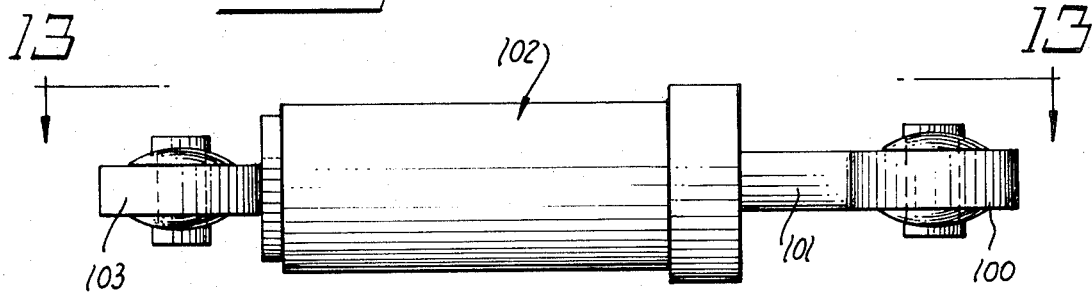
FIG. 12 is an elevational view of the hydraulic cylinder used to operate the lift hitch structure of FIG. 8.
Figure 13:
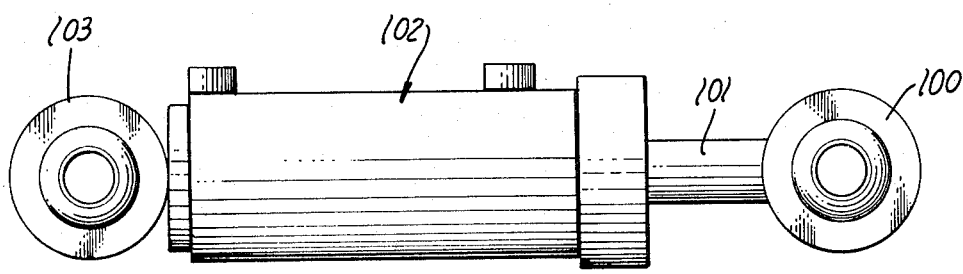
FIG. 13 is a horizontal plan view of the cylinder of FIG. 12, taken along the line 13—13 thereof, and looking in the direction of the arrows.

As shown in FIGS. 2 and 7, the lift hitch structure includes an upper lift link 111. As shown in FIG. 11, the upper lift link 111 includes the cylindrical tubular shaft 112 in the upper end of which is threadably mounted a shaft 113. Operatively mounted on the outer end of the shaft 113, is a ball joint assembly 114 which is hingedly connected by the hinge pin 115 to the upper ends of the mower bracket arms 75 and 76. As shown in FIG. 11, the link 111 further includes a second threaded shaft 116 which is threadably mounted in the lower end thereof, and secured by a suitable lock nut in an adjusted position. The outer end of the threaded shaft 116 is provided with a suitable ball joint assembly 117 which is attached by a suitable hinge pin 118 to a pair of bracket plates 119. As shown in FIG. 7, the bracket plates 119 are fixedly secured as by welding to the transverse stiffener tube 110.

The lift link assembly includes a pair of brace bars 79a and 79b (FIG. 2) which are secured between the tubular shaft 79 and the links 80 and 81.

As shown in FIGS. 1 and 3, the vehicle 10 is provided at the front end thereof with a dozer or scraper blade assembly 14 which includes a scraper blade 120 that is hingedly supported by a suitable support bracket. The scraper blade support bracket includes a pair of longitudinally disposed, and transversely spaced apart, tubular arms 121 and 122. The support brackets, arms 121 and 122, are interconnected by a pair of transversely disposed, fixedly mounted brackets 123.

As shown in FIG. 5, the rear end of the arm 122 is hingedly mounted on a suitable pivot pin 124 which is operatively supported by a pair of spaced apart bracket plates 125. The bracket plates 125 are shown as being welded to the front end of the vehicle body 15. The other support bracket arm 121 is similarly supported on the front end of the vehicle body 15 by a hinge pin 126 and a pair of fixed bracket plates 127.

As shown in FIGS. 2 and 3, a lift link 128 is fixed to the upper side of the support bracket arm 122. The scraper blade 120 is raised and lowered by the lift link 128 and a hydraulic cylinder 131, as shown in FIG. 3. The cylinder 131 is provided with a cylinder rod 130 which is hingedly connected by a suitable hinge pin 129 and a ball joint assembly 135 to the upper end of the lift link 128. The head end of the cylinder 131 is hingedly connected by a hinge pin 132 and a ball joint assembly 134 to a pair of bracket plates 133. As shown in FIG. 4, the bracket plates 133 are secured, as by welding, to the vehicle body 15. Hydraulic fluid is supplied to the cylinder 131 by a pair of hydraulic hoses 136a and 136b. The last mentioned hydraulic hoses are connected to a suitable source of hydraulic fluid under pressure which is carried on the vehicle 10.

FIGS. 14 and 14A illustrate a schematic hydraulic control circuit for supplying hydraulic fluid under pressure to the aforedescribed hydraulic cylinders 102 and 131 and hydraulic motor 33. As shown in FIG. 14, the illustrative hydraulic circuit includes a hydraulic pump 137 which would be driven by the engine in vehicle 10. The pump 137 is illustrated as being connected to a suitable hydraulic fluid reservoir 138 through suitable tubing and a strainer 139. The pump 137 forces hydraulic fluid under pressure into a tubing 140 and into a valve assembly generally indicated by the numeral 142a. The tubing 140 is connected to a suitable directional control valve 142 through a tubing 141. The valve 142 is operated by a suitable operating handle 143 for operating the valve to selectively send fluid into the tubings 144 and 145 or direct the flow from tubing 140 to tubing 165. The tubing 145 is connected by a suitable disconnect fitting 146 to the rotary cutter motor feed line 63b. The rotary cutter motor 33 is connected by the return tubing 63a to a suitable disconnect fitting 149 which is in turn connected to the reservoir 138 by tubings 148 and 154, the valve 142, and the strainer 155. The tubing 145 is also connected to the reservoir 138 by the tubing 147, 153 and 154 and the check valve 152. The rotary cutter motor 33 is also connected through the tubing 63a, the disconnect fitting 150, and tubing 151 to the reservoir 138 to provide a drain route for the case of motor 33.

The valve assembly 142a also includes by-pass circuits, for feeding fluid from the output line 140 back to the reservoir 138, which includes the two valves 157 and 163, and the tubes 156, 158, 159, 160, 161, 162, 164, 153 and 154, or to tubing 165 as determined by motor load and the position of valve 142.

The tubing 165 conducts fluid under pressure from the valve 142, as shown in FIG. 14, to a valve assembly 176a, as shown in FIG. 14A. The tubing 166 returns fluid from the valve assembly 176a in FIG. 14A to the reservoir 138, as shown in FIG. 14. The tubing 166 is also connected to a filter assembly 167a (FIG. 14) which includes the tubings 168 and 169 and the valve 167.

The valve assembly 176a includes a first directional control valve 176 for controlling flow of fluid to the scraper blade cylinder 131. The head end of cylinder 131 is connected by a tubing 136b to the flow control valve 176. The cylinder rod end of the cylinder 131 is connected through a valve assembly 170a to the valve 176. The tubing 136a connects the cylinder rod end of the cylinder 131 to the valve 170 which in turn is connected by the tubing 175 to the valve 176. The valve assembly 170a further includes the tubings 171, 172 and 174 and the check valve 173. The valve 176 is provided with a valve operating handle 177. Fluid is supplied from tubing 165 to the valve 176 through the tubing 178, the flow valve 180, and the tubing 181. Fluid also is conducted from tubing 165 to the valve 176 by a flow path through tubing 199 as shown in FIG. 14A. The valve 176 is exhausted to the tubing 166 through tubing 179.

The numeral 184 in FIG. 14A indicates a hydraulic cylinder which is adapted to operate an alternate implement which may be desired to be attached to the vehicle 10 and be hydraulically operated. The cylinder 184 is operatively connected by suitable tubing and valve structure to a directional control valve 185 which is adapted to be operated by a suitable valve operating handle 186.

The valve assembly 176a further includes a directional control valve 187 which is operated by the handle 188. The valve 187 is connected by the conduit 189 to the return conduit 166. The valve 187 is adapted to control the lift hitch motor 102. As shown in FIG. 14A, the head end of the cylinder 102 is connected by the conduit 106b to the valve 187. The cylinder rod end of the cylinder 102 is connected by the conduit 106a, the valve assembly 191a and the conduit 198 to the valve 187. The valve assembly 191a includes the valves 191 and 195, the flow restrictor 194 and the conduits 190, 192, 193, 196 and 197.

In use, the tractor drawn mower of the present invention can be used in any type of terrain where it is necessary to mow weeds, grass, brush and other foliage. The mower 11 may be lifted to an angled, raised position for transporting the same from place to place. In such a raised position, the lift hitch is in an automatic, mechanically locked condition.

The dozer blade 120 can be used to knock down brush and small trees which are then run over by the vehicle 10, and cut and chopped up by the mower 11. The mower 11 is adapted to float relatively to the vehicle 10 because of the particular lift hitch structure 12. The flexible tracked vehicle 10 can pull the hydraulically driven mower over wet grass and loose terrain where rubber tired tractors cannot operate. The hydraulic drive means for the mower described prevents any back forces from being passed on to the vehicle engine which would stall the same. The mower 11 of the present invention is capable of negotiating a steep angle change in terrain up to a 30° incline from the flat. The mower can be lifted up to a 30° angle at the back of the vehicle 10 when the vehicle is going up a grade and the same action can be carried out when the vehicle is going down a 30° change of grade which is not possible by the prior art mower machines. The aforementioned action is possible, because of the three-point lift hitch assembly and the hydraulic drive means for the rotary cutter.

The lift hitch assembly includes a mechanical down stop incorporated into the shape of the lift lever whereby the lift hitch cannot move downwardly beyond a certain point because of the lever engaging a stiffener assembly on the back of the vehicle 10. The mechanical down stop prevents the lift hitch cylinder 102 from being over-extended and damaged. The dozer blade assembly 120 also functions as a counterweight, if desired. The various ball joint means employed in the lift hitch assembly, and the fact that one lift link in the lower link assembly can be raised higher than the other permits the mower to be tilted, if desired. The tractor drawn mower of the present invention is adapted to be used to make fire lanes in a forest and thus eliminate the need for chemically spraying foliage to destroy the same to create such fire lanes.

The gear type coupling 32 is also disclosed in detail and claimed separately in a copending application which is owned by a common assignee and entitled "Gear Type Coupling," Ser. No. 115,410, filed Feb. 16, 1971.

While it will be apparent that the preferred embodiment of the invention herein disclosed is well calculated to fulfill the objects above stated, it will be appreciated that the invention is susceptible to modification, variation and change.

What is claimed is:

1. In a tractor drawn mower, the combination comprising:
   a. a flexible tracked tractor;
   b. a mower provided with a rotary cutter and being supported at the rear end thereof by a ground engaging means;
   c. a power source carried on said tractor;
   d. means for interconnecting said power source and said rotary cutter for rotating the cutter;
   e. a three-point lift hitch means carried by said tractor and having an upper link attached to said mower at a centered position at the front end of the mower, a lower link assembly attached to the front end of the mower at two spaced apart positions below the attachment position of the upper link, and including means for lifting said lower link assembly to a raised position where the lift hitch means is mechanically locked and the mower is in a raised position; and,
   f. said means for lifting said lower link assembly includes:
      1. a lift bar having its lower end pivotally attached to said lower link assembly;
      2. a lever pivotally mounted on a horizontal axis on said tractor, and the upper end of said lift bar being pivotally attached to said lever on a horizontal axis at a position spaced apart from the pivot axis of said lever on said tractor; and,
      3. power means mounted on said tractor and being pivotally connected to said lever on a horizontal axis at a point triangularly spaced from the pivot mounting axis of said lever and the pivot attachment axis of said lift bar, whereby when the power means is actuated in one direction, the lever is pivoted to lift said lower link assembly to a raised position and the centerline of the lift bar has passed the center of the pivot mounting axis of said lever to mechanically lock the lift hitch means in the raised position.

2. The structure as defined in claim 1, wherein said lift hitch means includes:
   a. a mechanical down-stop means.

3. The structure as defined in claim 1, wherein said lift hitch means includes:
   a. a mechanical up-lock means.

4. The structure as defined in claim 1, wherein said lift hitch means includes:
   a. a mechanical up-stop means.

5. The structure as defined in claim 1, wherein said lower link assembly includes:
   a. a pair of arms extending forwardly from said two spaced apart positions on the mower and disposed on opposite sides of the centerline of the tractor, and,
   b. means for hingedly connecting the front ends of said lower link assembly arms to the tractor.

6. The structure defined in claim 1, wherein said lower link assembly includes:

7. The structure as defined in claim 1, including:
   a. a scraper blade hingedly mounted on the front of said tractor, and,
   b. power means mounted on said tractor for raising and lowering said scraper blade.

8. The structure defined in claim 1 wherein said means for interconnecting said power source and said rotary cutter includes:
   a. a coupling means attached to said rotary cutter; and,
   b. a drive means connected to said coupling means and said power source for rotating the cutter.

9. The structure defined in claim 8 wherein said drive means comprises:
   a. a hydraulic motor and said power source comprise a source of pressurized hydraulic fluid.

10. The structure defined in claim 8 wherein said coupling means comprises:
    a. a gear type coupling.

11. The structure as defined in claim 10, wherein said gear type coupling includes:
    a. a first coupling portion attached to said rotary cutter;
    b. a second coupling portion attached to said drive means;
    c. means for operatively connecting said first and second coupling portions; and,
    d. cushion means between said first and second coupling portions.

12. The structure as defined in claim 11, including:
    a. a washer mounted between said cushion means and one of said coupling portions.

13. In an implement lift hitch for use on a powered vehicle, the combination comprising:
    a. an upper link including means for hingedly attaching one end to a vehicle and means for hingedly attaching the other end to the front end of an implement at a central position;

b. a lower link assembly including means for attachment to the front end of an implement at two spaced apart positions below the attachment position of the upper link and means for attachment to a vehicle;

c. a lift bar having a lower end pivotally attached to said lower link assembly;

d. a lever provided with means for pivotally mounting the lever on a horizontal axis on said vehicle, and with the upper end of said lift bar being pivotally attached to said lever on a horizontal axis at a position laterally spaced apart from, and parallel to, the pivot axis of said lever on said vehicle; and, e. power means adapted to be mounted on said vehicle and being pivotally connected to said lever on a horizontal axis at a point triangularly spaced from, and parallel to, the pivotal mounting axes of said lever and said lift bar, wherein when the power means is actuated, the lever is pivoted upwardly to lift said lower link assembly to a raised position.

14. The structure as defined in claim 13, wherein:

a. said lever is vertically disposed and triangularly shaped, with said horizontal pivotal axes being each disposed at one of the corners of the lever.

15. The structure as defined in claim 13, wherein:

a. said power means comprises a hydraulic cylinder pivotally attached to the vehicle and having a cylinder rod pivotally attached to said lever.

16. The structure as defined in claim 13, including:

a. means for locking the implement in a raised position.

17. In a tractor drawn mower, the combination comprising:

a. a flexible tracked tractor;

b. a mower provided with a rotary cutter and being supported at the rear end thereof by a ground engaging means;

c. a power source carried on said tractor;

d. means for interconnecting said power source and said rotary cutter for rotating the cutter;

e. a three-point lift hitch means carried by said tractor and operatively attached to said mower for supporting the front end thereof in a mowing position, and for pulling the mower and for lifting the mower to various positions raised above the ground; and, f. said three-point lift hitch means includes, 1. an upper link having one end pivotally attached to the front end of said mower and the other end pivotally attached to the tractor;

2. a lower link assembly having one end thereof pivotally attached to the tractor and the other end thereof pivotally attached to the front end of the mower at two spaced apart positions below the attachment position of the upper link;

3. a lift bar having a lower end pivotally attached to said lower link assembly;

4. a lever pivotally mounted on a horizontal axis on said tractor, and with the upper end of said lift bar being pivotally attached to said lever on a horizontal axis at a position laterally spaced apart from, and parallel to, the pivot axis of said lever on said tractor; and 5. power means mounted on said tractor and being pivotally connected to said lever on a horizontal axis at a point triangularly spaced from, and parallel to, the pivotal mounting axes of said lever and said lift bar, wherein when the power means is actuated, the lever is pivoted upwardly from a mowing position to lift said lower link assembly to a raised position.

18. The structure as defined in claim 17, wherein:

a. said lever is vertically disposed and triangularly shaped, with said horizontal pivotal axes being each disposed at one of the corners of the lever.

19. The structure as defined in claim 17, wherein:

a. said power means comprises a hydraulic cylinder pivotally attached to the tractor and having a cylinder rod pivotally attached to said lever.

20. The structure as defined in claim 17, wherein said three-point lift hitch means includes:

a. means for locking the mower in a raised position.

21. In an implement lift hitch for use on a powered vehicle, the combination comprising:

a. an upper link including means for hingedly attaching one end to a vehicle and means for hingedly attaching the other end to the front end of an implement at a central position;

b. a lower link assembly including means for attachment to the front end of an implement at two spaced apart positions below the attachment position of the upper link and means for attachment to a vehicle;

c. means for lifting said lower link assembly to a raised position where the lift hitch is locked and the implement is held in a fully raised position; and, d. said means for lifting said lower link assembly including, 1. a lift bar having its lower end pivotally attached to said lower link assembly;

2. a lever provided with means for pivotally mounting the lever on a horizontal pivot mounting axis on said vehicle, and the upper end of said lift bar being pivotally attached to said lever on a horizontal pivot attachment axis at a position spaced apart from the pivot mounting axis of said lever on said vehicle; and, 3. power means adapted to be mounted on said vehicle and being pivotally connected to said lever on a horizontal axis at a point triangularly spaced from the pivot mounting axis of said lever and the pivot attachment axis of said lift bar, whereby when the power means is actuated in one direction, the lever is pivoted to lift said lower link assembly to a fully raised position and the centerline of the lift bar has passed the center of the pivot mounting axis of said lever to mechanically lock the lift hitch means in the fully raised position.

22. The structure as defined in claim 21, including:

a. a mechanical up-stop means.

23. The structure as defined in claim 21, wherein:

a. said means for lifting said lower link assembly includes a mechanical up-lock means for locking the lift hitch in said fully raised position.

24. The structure as defined in claim 21, wherein:

a. said means for lifting said lower link assembly is constructed and arranged so that said implement can float upwardly and downwardly relative to a vehicle as it is being pulled by a vehicle.

25. The structure as defined in claim 21, including:
   a. a mechanical down-stop means.

26. The structure as defined in claim 21, wherein said lower link assembly includes:
   a. a pair of arms extending forwardly from said two spaced apart positions on the implement and disposed on opposite sides of the centerline of the vehicle; and,
   b. said means for attachment to a vehicle includes means for hingedly connecting the front ends of said lower link assembly arms to the vehicle.

27. The structure defined in claim 21, wherein said lower link assembly includes:
   a. tilt means for tilting the implement about its longitudinal axis.

28. In an implement lift hitch for use on a powered vehicle, the combination comprising:
   a. an upper link including means for hingedly attaching one end to a vehicle and means for hingedly attaching the other end to the front end of an implement at a central position;
   b. a lower link assembly including means for attachment to the front end of an implement at two spaced apart positions below the attachment position of the upper link and means for attachment to a vehicle;
   c. means for lifting said lower link assembly to a raised position where the lift hitch is locked and the implement is held in a fully raised position;
   d. said lower link assembly including tilt means for tilting the implement about its longitudinal axis; and,
   e. said tilt means including,
      1. a transverse, tubular shaft carried on said lower link assembly;
      2. an attachment link rotatably mounted on each end of said tubular shaft for attaching the lower link assembly to the implement; and,
      3. means for securing the attachment links in rotated positions incrementally adjusted relative to each other to tilt the implement about its longitudinal axis.

29. In a tractor drawn mower, the combination comprising:
   a. a flexible tracked tractor;
   b. a mower provided with a rotary cutter and being supported at the rear end thereof by a ground engaging means;
   c. a power source carried on said tractor;
   d. means for interconnecting said power source and said rotary cutter for rotating the cutter;
   e. a three-point lift hitch means carried by said tractor and having an upper link attached to said mower at a centered position at the front end of the mower, a lower link assembly attached to the front end of the mower at two spaced apart positions below the attachment position of the upper link, and including means for lifting said lower link assembly to a raised position where the lift hitch means is mechanically locked and the mower is in a raised position;
   f. said lower link assembly including tilt means for tilting the mower about its longitudinal axis; and,
   g. said tilt means including,
      1. a transverse, tubular shaft carried on said lower link assembly;
      2. an attachment link rotatably mounted on each end of said tubular shaft for attaching the lower link assembly to the mower; and,
      3. means for securing the attachment links in positions incrementally adjusted relative to each other to tilt the mower about its longitudinal axis.

30. In an implement lift hitch for use on a powered vehicle, the combination comprising:
   a. a link assembly including means for attachment to the front end of an implement at two spaced apart positions and means for attachment to a vehicle;
   b. means for lifting said link assembly to a raised position where the lift hitch is locked and the implement is held in a fully raised position; and,
   c. said means for lifting said link assembly including,
      1. a lift bar having its lower end pivotally attached to said link assembly;
      2. a lever provided with means for pivotally mounting the lever on a horizontal pivot mounting axis on said vehicle, and the upper end of said lift bar being pivotally attached to said lever on a horizontal pivot attachment axis at a position spaced apart from the pivot mounting axis of said lever on said vehicle; and,
      3. power means adapted to be mounted on said vehicle and being pivotally connected to said lever on a horizontal axis at a point triangularly spaced from the pivot mounting axis of said lever and the pivot attachment axis of said lift bar, whereby when the power means is actuated in one direction, the lever is pivoted to lift said link assembly to a fully raised position and the centerline of the lift bar has passed the center of the pivot mounting axis of said lever to mechanically lock the lift hitch means in the fully raised position.

31. The structure as defined in claim 30, wherein said link assembly includes:
   a. a pair of arms extending forwardly from said two spaced apart positions on the implement and disposed on opposite sides of the centerline of the vehicle; and,
   b. said means for attachment to a vehicle includes means for hingedly connecting the front ends of said link assembly arms to the vehicle.

32. The structure defined in claim 30, wherein said link assembly includes:
   a. tilt means for tilting the implement about its longitudinal axis.

33. The structure defined in claim 32, wherein said tilt means includes:
   a. a transverse, tubular shaft carried on said link assembly;
   b. an attachment link rotatably mounted on each end of said tubular shaft for attaching the link assembly to the implement; and,
   c. means for securing the attachment links in rotated positions incrementally adjusted relative to each other to tilt the implement about its longitudinal axis.

34. The structure as defined in claim 33, wherein:
a. said means for lifting said link assembly is constructed and arranged so that said implement can float upwardly and downwardly relative to a vehicle as it is being pulled by a vehicle.

* * * * *